(12) United States Patent
Abe

(10) Patent No.: US 7,206,942 B2
(45) Date of Patent: Apr. 17, 2007

(54) RECORDING MEDIUM CARTRIDGE AND A RECORDING-AND-REPRODUCING APPARATUS THEREOF

(75) Inventor: Naoto Abe, Kanagawa (JP)

(73) Assignee: FujiFilm Corporation, Tokyo (JP)

( * ) Notice: Subject to any disclaimer, the term of this patent is extended or adjusted under 35 U.S.C. 154(b) by 510 days.

(21) Appl. No.: 10/717,482

(22) Filed: Nov. 21, 2003

(65) Prior Publication Data

US 2004/0101140 A1 May 27, 2004

(30) Foreign Application Priority Data

Nov. 25, 2002 (JP) .............................. 2002-340863

(51) Int. Cl.
G06F 12/14 (2006.01)
G06F 7/04 (2006.01)
H04L 9/32 (2006.01)

(52) U.S. Cl. .................. 713/193; 340/5.24; 380/22

(58) Field of Classification Search ............ 380/22, 380/277; 340/5.24; 713/193
See application file for complete search history.

(56) References Cited

U.S. PATENT DOCUMENTS

2002/0035695 A1* 3/2002 Riches et al. ............... 713/193
2002/0174353 A1* 11/2002 Lee ............................. 713/193
2003/0074572 A1* 4/2003 Hayashi ...................... 713/193

FOREIGN PATENT DOCUMENTS

JP     2001-332064      11/2001

* cited by examiner

Primary Examiner—R. Stephen Dildine
(74) Attorney, Agent, or Firm—Sughrue Mion, PLLC

(57) ABSTRACT

A recording-medium cartridge including a recording-medium and a cartridge memory. In this recording-medium cartridge, the cartridge memory holds a unique cryptographic key in the condition that the rewrite of the cryptographic key is forbidden, and is detachably attached to the recording-medium cartridge. The recording-medium holds a CRC-code, which is generated based on the cryptographic key and data to be recorded on the recording-medium, and data in the condition that the CRC-code is correlated with the data.

22 Claims, 4 Drawing Sheets

RECORDING MEDIUM CARTRIDGE AND A RECORDING-AND-REPRODUCING APPARATUS THEREOF

BACKGROUND OF THE INVENTION

1. Field of the Invention

The present invention relates to a recording-medium cartridge equipped with a cartridge memory (a memory which can exchange data in a contactless manner), and relates to a recording-and-reproducing apparatus of the recording-medium cartridge.

2. Description of Relevant Art

A conventional recording-medium cartridge, which stores a recording-medium, such as a magnetic tape, is equipped with a cartridge memory. This cartridge memory mainly holds the information, such as a serial number (production number) and history information, which is unique information with regard to the magnetic tape.

In this recording-medium cartridge equipped with the cartridge memory, the exchange of data and the supply of power are performed in a contactless manner. To be more precise, the exchange of data between the cartridge memory and an external device and the supply of power to the cartridge memory are performed in a contactless manner by utilizing an electromagnetic induction. Therefore, the cartridge memory is stored in the cartridge case. As an example of these kinds of the recording-medium cartridge, the recording-medium cartridge disclosed in Japanese unexamined patent publication JP2001-332064 can be cited.

In this conventional recording-medium cartridge, the magnetic tape is allowed to perform the recording, reproducing, and correction of data. Thus, the authenticity of data cannot be certified, as the determination of whether the data had been tampered with cannot be performed easily.

When data stored in the recording-medium cartridge is the data used in the medical field or legal field, the authenticity of data is required and the checking of the authenticity should be performed easily.

Further, since the readout of data from the magnetic tape can be easily performed in the conventional recording-medium cartridge, in the event that the recording-medium cartridge is stolen, the possibility of an unauthorized retrieval of stored information presents a serious problem.

Therefore, the recording-medium cartridge, in which the authenticity of data recorded on the recording-medium (magnetic tape) is easily certified, and which can prevent the unauthorized retrieval of data recorded on the recording-medium (magnetic tape) in the event the recording-medium cartridge is stolen, is required.

SUMMARY OF THE INVENTION

The present invention relates to a recording-medium cartridge which stores a recording-medium and a cartridge memory. In this recording-medium cartridge, the cartridge memory, which holds a unique cryptographic key where a rewrite of the cryptographic key is forbidden, is detachably attached to the recording-medium cartridge. The recording-medium holds a cyclic redundancy check code (CRC-code) and data which are correlated with each other. Here, the CRC-code is generated based on the cryptographic key, and data is information to be recorded on the recording-medium.

In this recording-medium cartridge, since the cartridge memory is detachably attached to the recording-medium cartridge, the recording-medium cartridge and the cartridge memory can be stored in separate places. Thus, the unauthorized retrieval of the data stored in the recording-medium cartridge can be prevented when the recording-medium cartridge is stolen. Such is due to the fact that the reproducing of data cannot be performed without the cartridge memory.

In the recording-medium, a CRC-code and data are stored. The CRC-code is generated based on the cryptographic key and the CRC-code correlates to the corresponding data.

Thus, unauthorized retrieval of data recorded on the magnetic tape can be detected even when the cartridge memory having another cryptographic key is installed in the recording-medium cartridge. This is because the CRC-code being recorded on the recording-medium does not match the reference CRC-code generated from the data obtained from the recording-medium and the cryptographic key. Therefore, unauthorized retrieval and reproduction of stored data can be preempted by comparing the reference CRC-code with the CRC-code.

The present invention relates to a recording-and-reproducing apparatus which performs a recording-and-reproducing of data against the above-described recording-medium cartridge. This recording-and-reproducing apparatus includes a CRC-code generator, a CRC-code recorder, a CRC-code comparator, and a reproducing controller.

In this apparatus, the CRC-code generator generates a CRC-code based on a cryptographic key, which is obtained from a cartridge memory stored in the recording-medium cartridge, and data entered from an external device, when performing a recording of data on the recording-medium. The CRC-code recorder records the CRC-code on the recording-medium.

The CRC-code generator, additionally, generates a reference CRC-code based on a cryptographic key, which is obtained from the cartridge memory, and data obtained from the recording-medium, when performing a reproducing of data recorded on the recording-medium. Then, the reference CRC-code generated by the CRC-code generator is compared with the CRC-code obtained from the recording-medium by the CRC-code comparator. The reproducing controller determines whether or not to allow the reproducing of the data recorded on the recording-medium based on the comparison result of the CRC-code comparator.

In this apparatus, when performing the recording, the CRC-code is generated by the CRC-code generator based on the data entered from the external device and the cryptographic key obtained from the cartridge memory. Then, the CRC-code is recorded on the recording-medium by the CRC-code recorder.

In this apparatus, when performing a reproducing, the data and the CRC-code are obtained from the recording-medium, and the cryptographic key is obtained from the cartridge memory. Then, the reference CRC-code is generated by the CRC-code generator based on data and cryptographic key, and comparison of the reference CRC-code and the CRC-code is performed by the CRC-code comparator. Finally, the reproducing of data is allowed only when the reference CRC-code agrees with the CRC-code.

Thus, if unauthorized retrieval or reproduction of data is attempted using the cartridge memory having a different cryptographic key, the reproduction of data is preempted. This is because the reference CRC-code does not match that of the CRC-code.

In the present invention, it is preferable that the recording-and-reproducing apparatus has a unique identification number. In this apparatus, the CRC-code is generated based on the data entered from the external device, the cryptographic key, and the unique identification number, when performing a recording. Additionally, the reference CRC-code is generated based on data obtained from the recording-medium, the cryptographic key, and the unique identification number.

In this apparatus, the CRC-code and the reference CRC-code are generated using the unique identification number in addition to data and the cryptographic key. Thus, the unauthorized retrieval and reproduction of data can be prevented even if the recording-medium cartridge and the corresponding cartridge memory are stolen. This, is because the unique identification code is required for generating the CRC-code and the reference CRC-code.

DETAILED DESCRIPTION OF THE PREFERRED EMBODIMENT

First Embodiment

The preferred embodiment of the recording-medium cartridge and the recording-and-reproducing apparatus according to the present invention will be explained. In the following explanation, a magnetic tape cartridge is used as an example of the recording-medium cartridge.

Figure 1A:
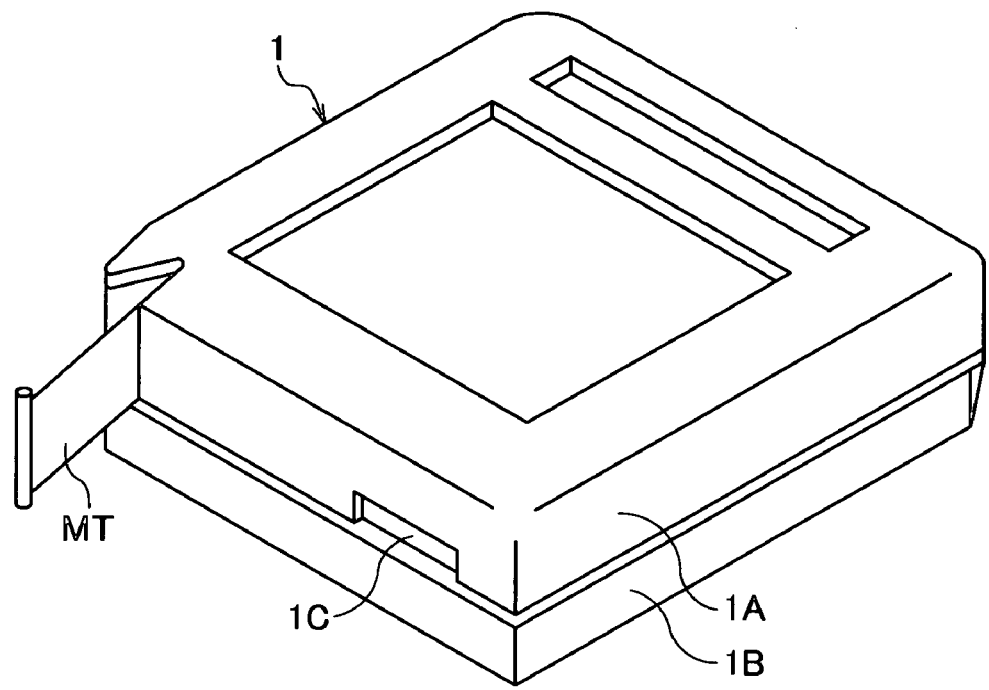
FIG. 1A is a perspective view showing the magnetic tape cartridge.
Figure 1B:
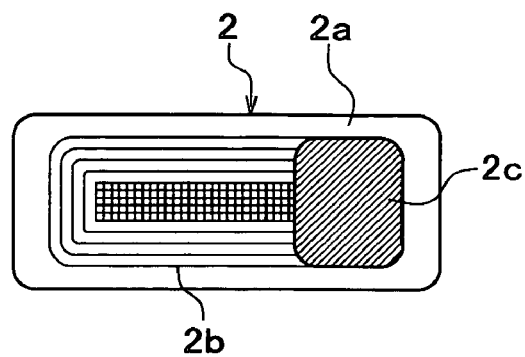
FIG. 1B is a plane view showing the cartridge memory being stored in the magnetic tape cartridge.

As shown in FIG. 1A and FIG. 1B, a magnetic tape cartridge 1 (recording-medium cartridge) is composed of an upper-half 1A and a lower-half 1B, which are put together into a single piece, and stores a magnetic tape MT and a cartridge memory 2 therein.

The cartridge memory 2 is an electronic part having a shape of thin rectangular plate, and is composed of a base plate 2a, a loop antenna 2b, an IC-tip (not shown), and a globe top 2c. In this cartridge memory 2, the loop antenna 2b is provided on the base plate 2a using a printing technique and the IC-tip enclosed in a globe top 2c made of plastic sealant is connected to a loop antenna 2b.

In this cartridge memory 2, the IC-tip holds a cryptographic key SK, which is determined arbitrarily, in the condition that the rewrite of the cryptographic key SK is forbidden. Additionally, the cartridge memory 2 is detachably installed in the magnetic tape cartridge 1. Here, this installation of the cartridge memory 2 is performed through an inlet 1C. Thereby, the magnetic tape cartridge 1 and the cartridge memory 2 can be separately stored.

Figure 2:
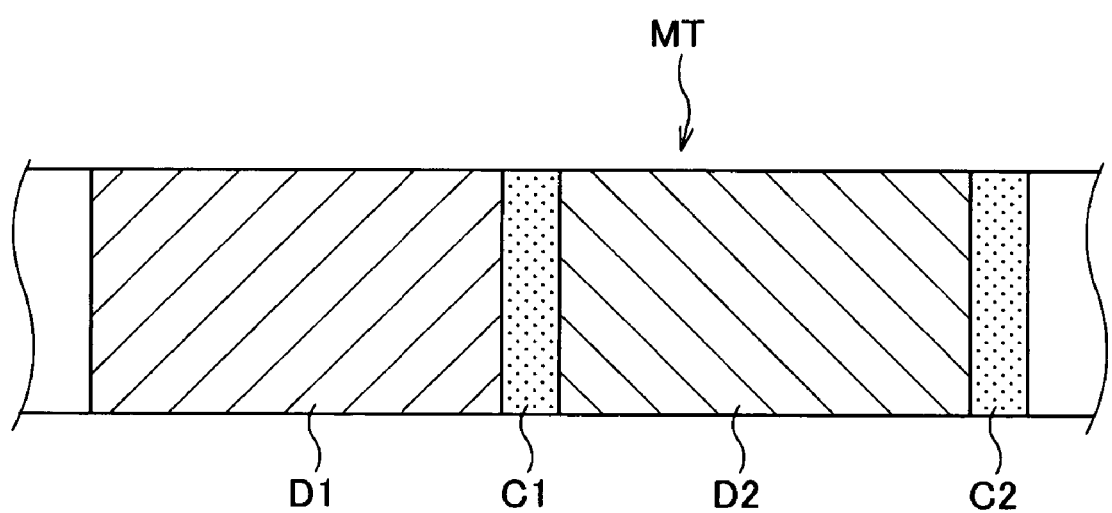
FIG. 2 is a pattern diagram showing the construction of the data recorded on the magnetic tape.

As shown in FIG. 2, plurality of data D1, D2 . . . are recorded on the magnetic tape MT. In the region of data D1 on the magnetic tape MT, concrete information and a CRC-code are recorded in the condition that the CRC-code and data adjoin with each other. Here, the CRC-code (cyclic redundancy checking code) is a code generated based on the cryptographic key SK recorded on the cartridge memory 2 and the data to be recorded on the magnetic tape. Other data following to data D1, such as D2 . . . have the same construction.

Hereinafter, the explanation about how to prevent the falsification of data will be explained using the data D1 among data to be recorded on the magnetic tape MT.

Here, the term "CRC-code" means that a cyclic redundancy checking code, which is a digital error detection code used in digital recording. In the present embodiment, "CRC-code" corresponds to a remainder, which is obtained by dividing the data by a specific constant number (CRC generator polynomial).

Figure 3:
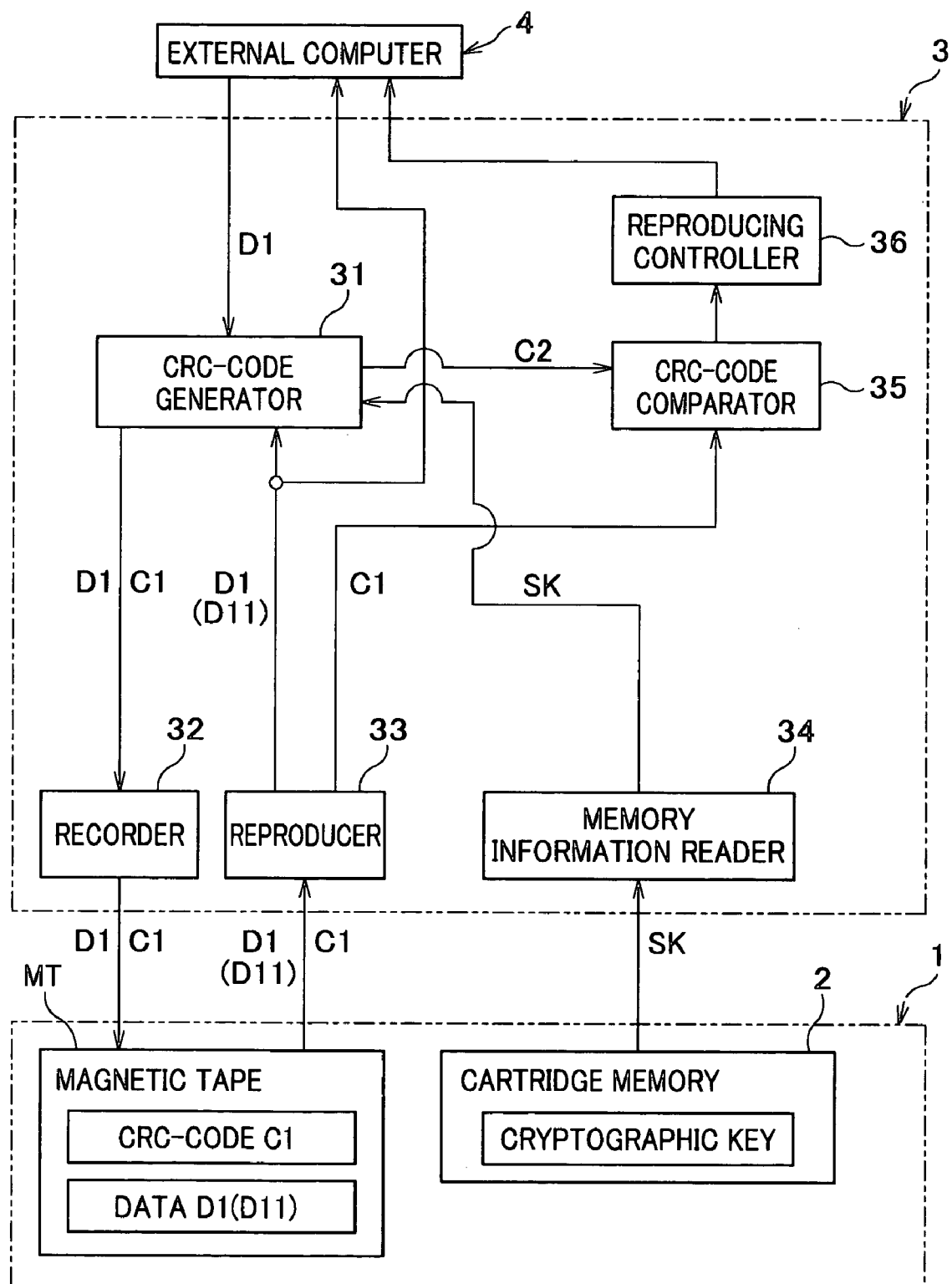
FIG. 3 is a block diagram showing the recording-and-reproducing apparatus.

As shown in FIG. 3, the recording-and-reproducing apparatus 3 includes a CRC-code generator 31, a recorder 32, a reproducer 33, a memory information reader 34, a CRC-code comparator 35, and a reproducing controller 36.

The recording-and-reproducing apparatus 3 is connected to an external computer 4. The external computer 4 supplies data D1 to be recorded on the magnetic tape MT, which is stored in the magnetic tape cartridge 1, to the CRC-code generator 31 of the recording-and-reproducing apparatus 3. Additionally, the external computer 4 outputs or reproduces the data obtained from the magnetic tape MT in compliance with a command signal entered from the reproducing controller 36.

When performing a recording of data on the magnetic tape MT, the CRC-code generator 31 generates a CRC-code C1 based on data D1 and cryptographic key SK, which is obtained from the cartridge memory 2 by the memory information reader 34. Then, the CRC-code generator 31 supplies the CRC-code C1 and data D1 to the recorder 32.

When performing a reproducing of data, on the other hand, the CRC-code generator 31 generates a CRC-code C2 (reference CRC-code) based on data D1, which is obtained from the magnetic tape MT, and cryptographic key SK, which is obtained from the cartridge memory 2. Then, the CRC-code generator 31 supplies the CRC-code C2 to the CRC-code comparator 35.

The recorder 32 performs the recording of the data D1 entered from the external computer 4 and of the CRC-code C1 generated by the CRC-code generator 31 on the magnetic tape MT, respectively.

The reproducer 33 obtains the CRC-code C1 and data D1 from the magnetic tape MT. Then, the reproducer 33 outputs the CRC-code C1 to the CRC-code comparator 35, and outputs data D1 to the external computer 4 and the CRC-code generator 31. The memory information reader 34 obtains the cryptographic key SK from the cartridge memory 2 and outputs the cryptographic key SK to the CRC-code generator 31.

The CRC-code comparator 35 compares the CRC-code C2 entered from the CRC-code generator 31 with the CRC-code C1 entered from the reproducer 33, and obtains a comparison signal which indicates whether or not the CRC-code C1 agrees with the CRC-code C2. Then, the CRC-code comparator 35 outputs the comparison signal to the reproducing controller 36.

The reproducing controller 36 determines whether or not to allow the reproducing of data D1 recorded on the magnetic tape MT based on the comparison signal entered from the CRC-code comparator 35.

To be more precise, the reproducing controller 36 outputs the command signal, which allows the reproducing of data D1, to the external computer 4, when the CRC-code C1 agrees with the CRC-code C2. On the other hand, the reproducing controller 36 outputs the command signal, which forbids the reproducing of data D1, to the external computer 4, when the CRC-code C1 disagrees with the CRC-code C2.

Recording-and-Reproducing by the Recording-and-Reproducing Apparatus

Next, recording/reproducing of data on/from the magnetic tape MT will be explained.

When performing a recording, the blank magnetic tape cartridge 1 is installed in the recording-and-reproducing apparatus 3. Then, the CRC-code generator 31 generates the CRC-code C1 based on data D1 and the cryptographic key SK entered from the memory information reader 34, when data D1 is entered from the external computer 4. Next, the CRC-code generator 31 outputs data D1 and CRC-code C1 to the recorder 32. Then, the recorder 32 records data D1 and CRC-code C1 on the magnetic tape MT.

When reproducing data stored in the magnetic tape MT, the reproducer 33 obtains data D1 and CRC-code C1 from the magnetic tape MT, and outputs data D1 to the CRC-code generator 31 and the external computer 4, respectively. The reproducer 33 simultaneously outputs the CRC-code C1 to the CRC-code comparator 35.

In this occasion, the memory information reader 34 obtains the cryptographic key SK from the cartridge memory 2 and outputs the cryptographic key SK to the CRC-code generator 31. The CRC-code generator 31 generates the CRC-code C2 based on data D1 and the cryptographic key SK, and outputs the CRC-code C2 to the CRC-code comparator 35.

Then, the CRC-code comparator 35 compares the CRC-code C1 entered from the reproducer 33 with the CRC-code C2 entered from the CRC-code generator 31, and computes the comparison signal that indicates whether or not the CRC-code C1 agrees with the CRC-code C2.

Here, if data D1 is falsified and is changed to data D11, the CRC-code C2, which is obtained based on the cryptographic key and data D11, disagrees with the CRC-code C1.

In this case, since the reproducing controller 36 outputs the command signal, which forbids a reproducing of data D11, to the external computer 4, the occurrence of the falsification of data D1 can be recognized.

If the cartridge memory 2 and the magnetic tape cartridge 1 are stored in separate places, the falsification of the CRC-code C2 cannot be performed. This is because the recording and changing of data D1 on the magnetic tape MT cannot be performed without the corresponding accurate cryptographic key.

Thereby, the occurrence of the falsification of data D1 can be detected even if the falsification of data D1 and CRC-code C1 is performed, when performing a reproducing of data D1 using the cartridge memory 2.

Additionally, when the cartridge memory 2 and the magnetic tape cartridge 1 are stored in separate places, a reproducing of data D1 cannot be achieved even if only the magnetic tape cartridge 1 is stolen and a reproducing of data D1 is tried by using the cartridge memory having a different cryptographic key. This is because the CRC-code C1, which is recorded on the magnetic tape MT, disagrees with the CRC-code, which is generated based on data D1 and the wrong cryptographic key.

According to the present embodiment, benefits as follow can be obtained.

(1) Checking of the authenticity of data D1 on the magnetic tape MT can be performed only by comparing the CRC-code C1, which is recorded on the magnetic tape MT, with the CRC-code C2, which is generated based on data D1 and the cryptographic key SK.

(2) The leakage of data D1 recorded on the magnetic tape MT can be prevented even if the magnetic tape cartridge 1 (recording-medium cartridge) is stolen. This is because the cartridge memory 2 can be detached from the magnetic tape cartridge 1, and can be stored in a place other than the place where a magnetic tape cartridge 1 is stored.

Second Embodiment

Next, second preferred embodiment of the present invention will be explained.

Figure 4:
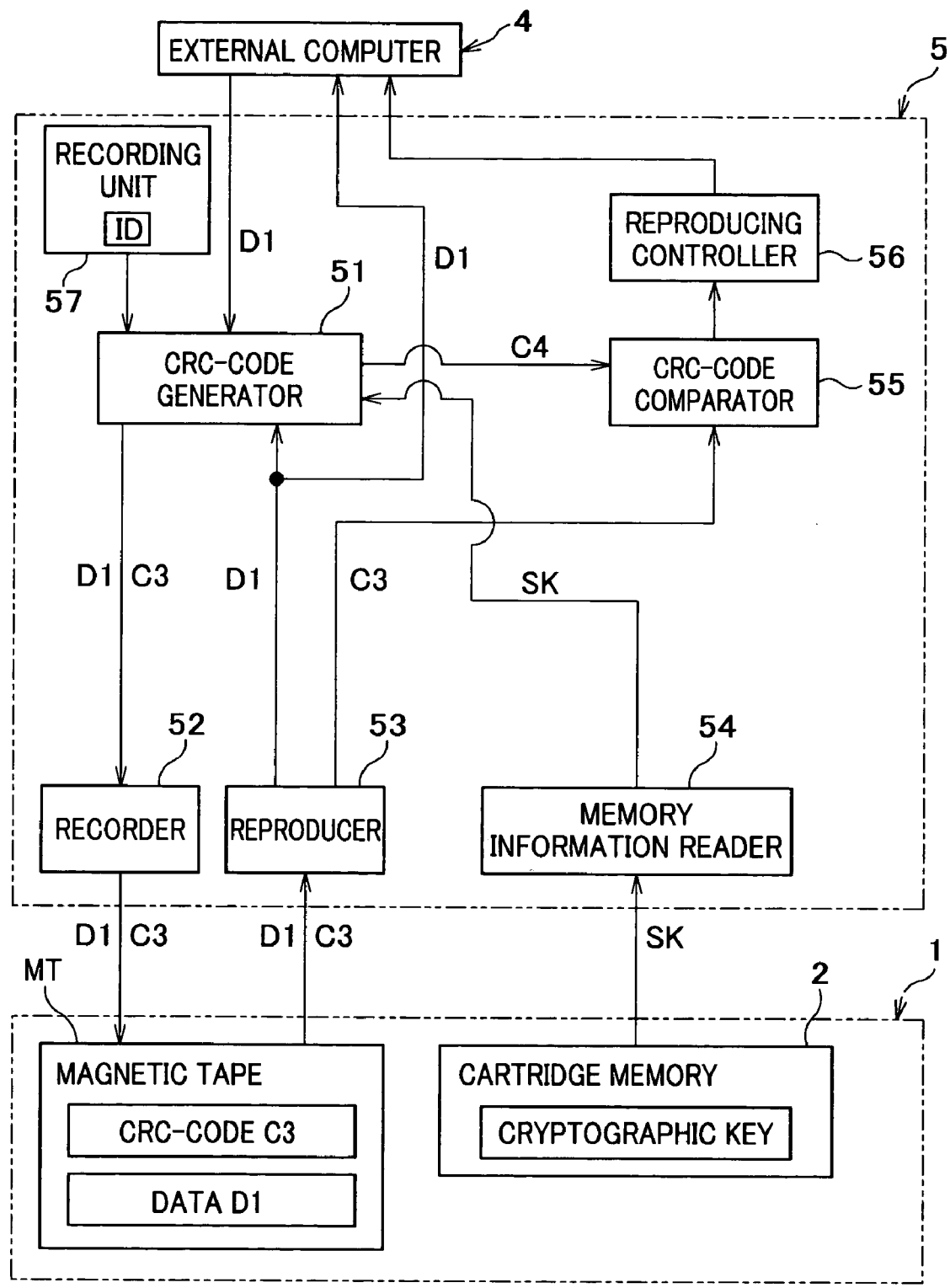
FIG. 4 is a block diagram showing the recording-and-reproducing apparatus of another embodiment.

As shown in FIG. 4, the recording-and-reproducing apparatus 5 has a recording unit 57 in addition to a CRC-code generator 51, a recorder 52, a reproducer 53, a memory information reader 54, a CRC-code comparator 55, and a reproducing controller 56.

In this recording-and-reproducing apparatus 5, the function of the CRC-code generator 51 slightly differs from that of first embodiment. Here, the recording unit 57 is a device which holds a unique identification number (ID number) therein.

When performing a recording, the CRC-code generator 51 generates a CRC-code C3 based on the data D1 entered from the external computer 4, a cryptographic key SK entered from the memory information reader 54, and ID number entered from the recording unit 57. Then, the CRC-code generator 51 outputs the CRC-code C3 to the recorder 52.

When performing a reproducing, the CRC-code generator 51 generates CRC-code C4 based on data D1 obtained from the magnetic tape MT, the cryptographic key SK entered from the memory information reader 54, and ID number entered from the recording unit 57. That is, the CRC-code generator 51 generates CRC-code C4 based on data D1, the cryptographic key SK, and the ID number. Then, the CRC-code generator 51 supplies the CRC-code C4 to the CRC-code comparator 55.

Recording-and-Reproducing by the Recording-and-Reproducing Apparatus

Next, the motion of the recording-and-reproducing apparatus 5 will be explained.

When performing a recording, data D1 is entered to the CRC-code generator 51. Then, the CRC-code C3 is generated by the CRC-code generator 51 based on data D1, the cryptographic key obtained from the cartridge memory 2, and the ID number entered from the recording unit 57. Next, the CRC-code generator 51 outputs the CRC-code C3 and data D1 to the recorder 52. Thus, the CRC-code C3 and data D1 are recorded on the magnetic tape MT by the recorder 52.

When performing a reproducing, on the other hand, the CRC-code C4 is generated by the CRC-code generator 51 based on data D1 entered from the reproducer 53, the cryptographic key entered from the memory information reader 54, and the ID number entered from the recording unit 57.

Then, the CRC-code C4 is supplied to the CRC-code comparator 55. The CRC-code comparator 55 compare the CRC-code C4 entered from the CRC-code generator 51 with the CRC-code C3 entered from the reproducer 53, and obtains a comparison signal which indicates whether or not the CRC-code C4 agrees with the CRC-code C3. Then, the CRC-code comparator 55 outputs the comparison signal to the reproducing controller 56. The reproducing controller 56 determines whether or not to allow a reproducing of data D1 recorded on the magnetic tape MT based on the comparison signal entered from the CRC-code comparator 55. Then, the reproducing controller 56 outputs the command signal, which indicates whether or not to allow the reproducing of data D1, to the external computer 4.

In the present embodiment, it is preferable that the cartridge memory 2, the magnetic tape cartridge 1, and the recording-and-reproducing apparatus 5 are stored in separate places, respectively, when storing the magnetic tape cartridge 1. Thereby, the reproducing of data D1 can be prevented even if the cartridge memory 2 is stolen.

According to the present second embodiment, benefits as follows can be obtained.

(3) Since the CRC-code C3 is generated in consideration of unique identification number (ID number) and is recorded on the magnetic tape MT, a reproducing of data D1 cannot be performed if the magnetic tape cartridge 1, the cartridge memory 2, and the recording-and-reproducing apparatus 5, which are used when performing a recording, are not used.

Thereby, the leakage of data D1 recorded on the magnetic tape can be prevented even if the magnetic tape cartridge and the cartridge memory are stolen. This is because the reproducing of data D1 cannot be performed without unique identification number (ID number) of the recording-and-reproducing apparatus 5.

Although there have been disclosed what are the patent embodiments of the invention, it will be understood by person skilled in the art that variations and modifications may be made thereto without departing from the scope of the invention, which is indicated by the appended claims.

In the above described embodiment, the rewrite of the cryptographic key is not allowed in the recording-and-reproducing apparatus. But the recording-and-reproducing apparatus may adopt a memory re-writing unit which changes the cryptographic key SK held in the IC-tip of the cartridge memory 2 in compliance with the command entered from an external device.

In the present embodiment, the recording-medium cartridge (magnetic tape cartridge), which adopts a magnetic tape, is used as an example of the recording-medium. But, the present invention is not limited to this. For example, a magnetic disk and an optical recording disk can be adoptable as the recording-medium. Additionally, an optical recording tape may be adoptable instead of the magnetic tape.

What is claimed is:

1. A recording-medium cartridge which stores a recording-medium and a cartridge memory, wherein
   the cartridge memory which holds a unique cryptographic key in the condition that the rewrite of the cryptographic key is forbidden is detachably attached to the recording-medium cartridge, and wherein
   the recording-medium holds a CRC-code, which is generated based on the cryptographic key and data to be recorded on the recording-medium, in the condition that the CRC-code is correlated with the data.

2. A recording-medium cartridge according to claim 1, wherein
   the CRC-code and data are recorded on the recording-medium in the condition that the CRC-code and data adjoin with each other.

3. A recording-medium cartridge according to claim 2, wherein
   the recording-medium cartridge is a magnetic tape.

4. A recording-medium cartridge according to claim 2, wherein
   the recording-medium cartridge is a magnetic disk.

5. A recording-medium cartridge according to claim 1, wherein
   the recording-medium cartridge is a magnetic tape.

6. A recording-medium cartridge according to claim 1, wherein
   the recording-medium cartridge is a magnetic disk.

7. A recording-medium cartridge according to claim 1, wherein
   the recording-medium cartridge is an optical recording tape.

8. A recording-medium cartridge according to claim 1, wherein
   the recording-medium cartridge is an optical recording disk.

9. A recording-and-reproducing apparatus which performs a recording-and-reproducing of data on a recording medium housed within a recording-medium cartridge, the recording-and-reproducing apparatus comprising:
   a CRC-code generator, which generates a CRC-code based on a cryptographic key, which is obtained from a cartridge memory detachably stored in the recording-medium cartridge, and data entered from an external device, when performing a recording of the data on the recording-medium, and
   the CRC-code generator generates a reference CRC-code based on a cryptographic key, which is obtained from the cartridge memory, and data obtained from the recording-medium, when performing a reproducing of the data recorded on the recording-medium;
   a CRC-code recorder which records the CRC-code on the-recording-medium when performing the recording of the data on the recording medium;
   a CRC-code comparator which compares the reference CRC-code generated by the CRC-code generator with the CRC-code obtained from the recording-medium, when performing the reproducing; and
   a reproducing controller which determines whether or not to allow the reproducing of data recorded on the recording-medium based on the comparison result of the CRC-code comparator.

10. The recording-and-reproducing apparatus according to claim 9, wherein
    the recording-and-reproducing apparatus has a unique identification number, and wherein
    the CRC-code generator generates the CRC-code based on the cryptographic key, the unique identification number, and data entered from an external device, when performing a recording, and
    the CRC-code generator generates the reference CRC-code based on the cryptographic key, the unique identification number, and data obtained from the recording-medium, when performing a reproducing.

11. The recording-medium cartridge according to claim 10, wherein the recording-medium cartridge is a magnetic tape.

12. The recording-medium cartridge according to claim 10, wherein the recording-medium cartridge is a magnetic disk.

13. The recording-and-reproducing apparatus, according to claim 9,
    wherein the CRC-code and data are recorded on the recording-medium in the condition that the CRC-code and data adjoin with each other.

14. The recording-medium cartridge according to claim 13, wherein the recording-medium cartridge is a magnetic tape.

15. The recording-and-reproducing apparatus according to claim 13, wherein
    the recording-and-reproducing apparatus has a unique identification number, and wherein
    the CRC-code generator generates the CRC-code based on the cryptographic key, the unique identification number, and data entered from an external device, when performing a recording, and the CRC-code generator generates the reference CRC-code based on the cryptographic key, the unique identification number, and data obtained from the recording-medium, when performing a reproducing.

16. The recording-medium cartridge according to claim 15, wherein the recording-medium cartridge is a magnetic tape.

17. The recording-medium cartridge according to claim 9, wherein the recording-medium cartridge is a magnetic tape.

18. The recording-medium cartridge according to claim 9, wherein the recording-medium cartridge is an optical recording tape.

19. The recording-medium cartridge according to claim 9, wherein the recording-medium cartridge is a magnetic disk.

20. The recording-medium cartridge according to claim 9, wherein the recording-medium cartridge is an optical recording disk.

21. A recording-medium cartridge which utilizes electromagnetic induction to exchange data with an external device in a contactless manner, the recording medium cartridge comprising:

a cartridge memory which contains a unique cryptographic key where a rewrite of the cryptographic key is forbidden and the cartridge memory is detachably attached to the recording-medium cartridge;

a recording-medium which holds a cyclic redundancy check (CRC) code where the CRC code is generated with the cryptographic key and data to be recorded on the recording-medium, wherein the CRC-code is correlated with the data to be recorded.

22. An apparatus for recording and reproducing data with a recording medium cartridge, the apparatus comprising:

a cyclic redundancy check (CRC) code generator which generates a first CRC code based on a cryptographic key obtained from a cartridge memory of the recording-medium cartridge and data entered from an external device when recording data on the recording medium of the recording medium cartridge, and generates a reference CRC code based on a cryptographic key obtained from the cartridge memory of the recording medium and data obtained from the recording-medium of the recording medium cartridge when reproducing data recorded on the recording medium of the recording medium cartridge;

a CRC code recorder which records the first CRC code on the recording medium of the recording medium cartridge when recording;

a CRC code comparator which compares the reference CRC code with the first CRC code obtained from the recording-medium of the recording medium cartridge, when reproducing the data recorded on the recording medium of the recording medium cartridge; and a reproducing controller which determines whether the reproducing of the data recorded on the recording-medium is allowed based on a comparison result of the CRC-code comparator.

* * * * *